United States Patent
Yang et al.

(10) Patent No.: US 11,937,214 B2
(45) Date of Patent: Mar. 19, 2024

(54) BANDWIDTH PART SWITCH FOR SIDELINK COMMUNICATION

(71) Applicant: QUALCOMM Incorporated, San Diego, CA (US)

(72) Inventors: Wei Yang, San Diego, CA (US); Seyedkianoush Hosseini, San Diego, CA (US); Linhai He, San Diego, CA (US); Hung Dinh Ly, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/462,913

(22) Filed: Aug. 31, 2021

(65) Prior Publication Data
US 2022/0116914 A1 Apr. 14, 2022

Related U.S. Application Data

(60) Provisional application No. 63/090,163, filed on Oct. 9, 2020.

(51) Int. Cl.
*H04W 72/25* (2023.01)
*H04L 5/00* (2006.01)
(Continued)

(52) U.S. Cl.
CPC ......... *H04W 72/02* (2013.01); *H04W 72/044* (2013.01); *H04W 72/20* (2023.01); *H04W 76/28* (2018.02)

(58) Field of Classification Search
CPC ..... H04W 72/02; H04W 72/25; H04W 92/18; H04W 24/04; H04W 72/04; H04W 76/15; Y02D 30/70; H04L 1/1887
(Continued)

(56) References Cited

U.S. PATENT DOCUMENTS

2018/0213365 A1* 7/2018 Yi ........................... H04W 4/06
2019/0158229 A1 5/2019 Wei et al.
(Continued)

FOREIGN PATENT DOCUMENTS

| EP | 3836686 A1 | 6/2021 |
|---|---|---|
| WO | 2020030177 A1 | 2/2020 |
| WO | 2020030688 A1 | 2/2020 |

OTHER PUBLICATIONS

Huawei, et al., "Sidelink Physical Layer Structure for NR V2X", 3GPP Draft, 3GPP TSG RAN WG1 Meeting #99, 3rdGeneration Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), 35 Pages, URL: https://ftp.3gpp.org/tsg_ran/WG1_RL1/TSGR1_99/Docs/R1-1911882.zip R1-1911882.docx [retrieved on Nov. 9, 2019] Common and Dedicated Resource Pools, p. 4, Paragraph 2.3—p. 5, Figure 2.
(Continued)

*Primary Examiner* — Khaled M Kassim
*Assistant Examiner* — Jason A Harley
(74) *Attorney, Agent, or Firm* — Procopio, Cory, Hargreaves & Savitch LLP

(57) ABSTRACT

Method, apparatus, and computer-readable medium of wireless communication at a sidelink device include: receiving a configuration of multiple bandwidth parts (BWPs) for sidelink communication, each bandwidth part (BWP) comprising one or more sidelink resource pools; activating a BWP from the multiple BWPs configured for the sidelink communication; and transmitting or receiving sidelink communication in resources from a resource pool in the activated BWP.

26 Claims, 15 Drawing Sheets

(51) Int. Cl.
  *H04W 72/02*   (2009.01)
  *H04W 72/04*   (2023.01)
  *H04W 72/044*   (2023.01)
  *H04W 72/0446*   (2023.01)
  *H04W 72/20*   (2023.01)
  *H04W 76/28*   (2018.01)

(58) Field of Classification Search
  USPC .......................................................... 370/329
  See application file for complete search history.

(56) References Cited

U.S. PATENT DOCUMENTS

| | | | |
|---|---|---|---|
| 2019/0306923 A1* | 10/2019 | Xiong | H04J 13/0062 |
| 2020/0295883 A1* | 9/2020 | Lee | H04L 5/0057 |
| 2020/0328864 A1* | 10/2020 | Choi | H04L 5/0094 |
| 2021/0150730 A1* | 5/2021 | Yu | G06T 7/143 |
| 2021/0168814 A1* | 6/2021 | Chen | H04W 72/02 |
| 2021/0306824 A1* | 9/2021 | Li | H04W 4/40 |
| 2021/0368479 A1* | 11/2021 | Yu | H04W 72/02 |
| 2022/0150730 A1* | 5/2022 | Freda | H04L 1/188 |
| 2022/0377566 A1* | 11/2022 | Shimezawa | H04W 52/0225 |
| 2023/0055108 A1* | 2/2023 | Beale | H04W 76/28 |

OTHER PUBLICATIONS

International Search Report and Written Opinion—PCT/US2021/048605—ISA/EPO—dated Dec. 13, 2021.

* cited by examiner

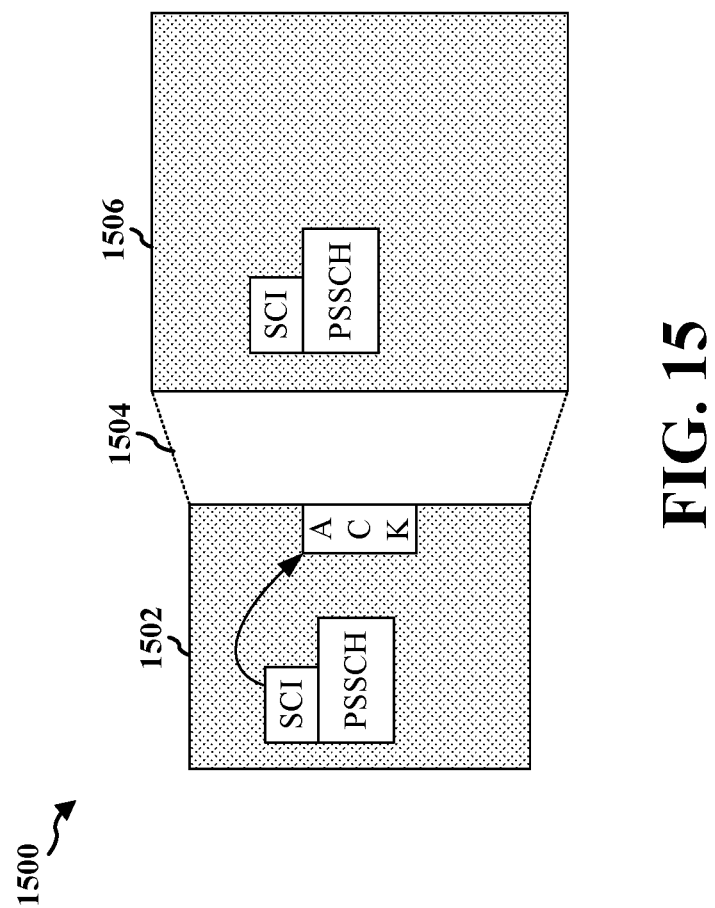

BANDWIDTH PART SWITCH FOR SIDELINK COMMUNICATION

CROSS REFERENCE TO RELATED APPLICATION(S)

This application claims the benefit of and priority to U.S. Provisional Application Ser. No. 63/090,163, entitled "Bandwidth Part Switch for Sidelink Communication" and filed on Oct. 9, 2020, which is expressly incorporated by reference herein in its entirety.

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a sidelink device are provided. The apparatus includes means for receiving a configuration of multiple bandwidth parts (BWPs) for sidelink communication, each bandwidth part (BWP) comprising one or more sidelink resource pools; means for activating a BWP from the multiple BWPs configured for the sidelink communication; and means for transmitting or receiving sidelink communication in resources from a resource pool in the activated BWP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 15 illustrates an example timing of the BWP switch from the first BWP to the second BWP.

DETAILED DESCRIPTION

Figure 1:
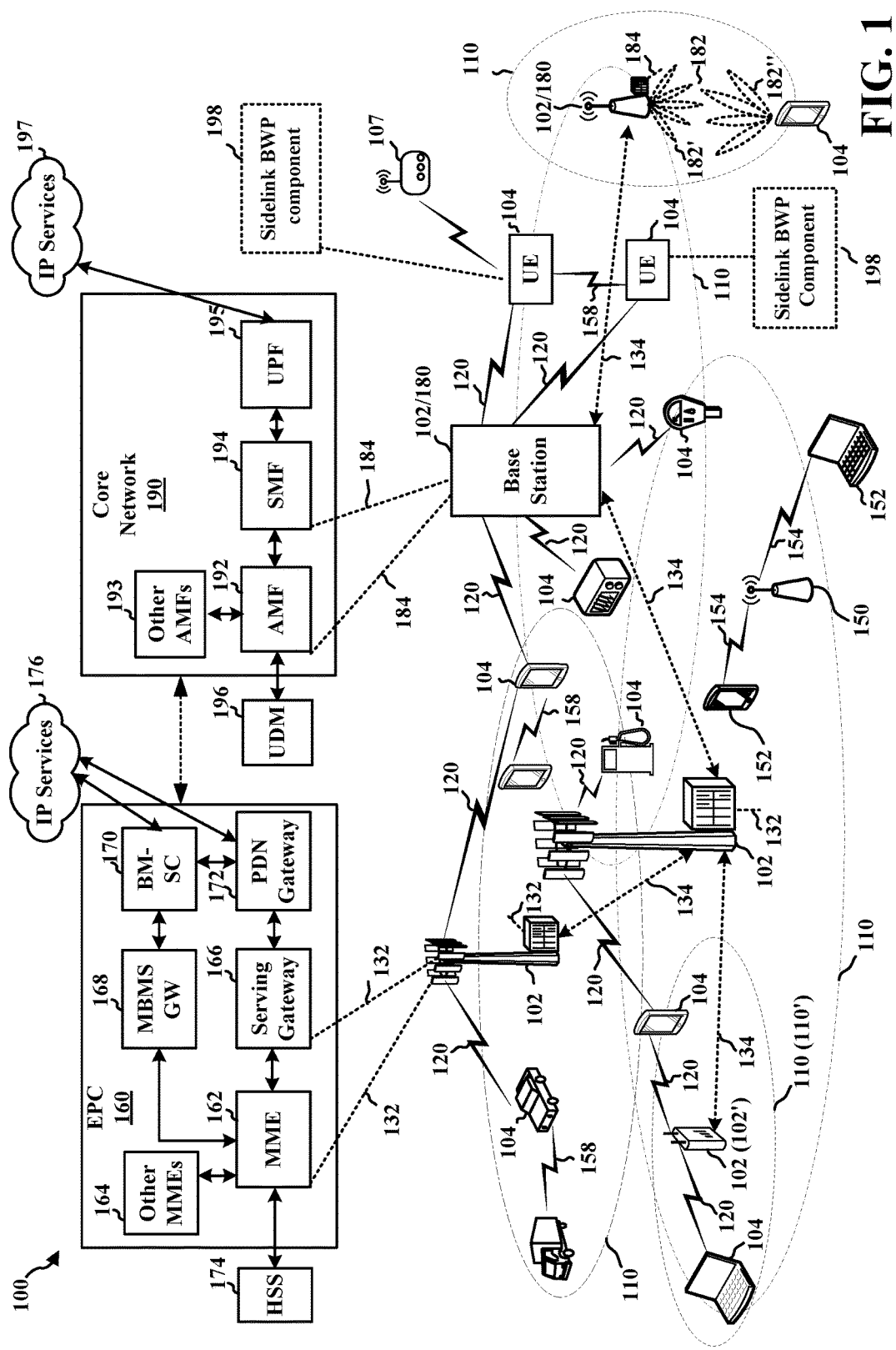
FIG. 1 is a diagram illustrating an example of a wireless communications system and an access network.

The use of a BWP that includes a subset of contiguous resource blocks within a frequency range of a carrier may enable a UE to achieve power savings. Sidelink communication that occurs directly between UEs may include unique challenges to avoid interference that are different than communication between a UE and a base station. Sidelink communication may include a single BWP for a sidelink carrier, e.g., which may help to avoid interference among sidelink transmissions. However, a single BWP constrains a UE's ability to achieve power savings through communication over narrower bandwidths. Aspects presented herein provide for the configuration of multiple BWPs in a sidelink carrier with each BWP including one or more resource pools.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include a sidelink BWP component 198 configured to receive a configuration of multiple BWPs for sidelink communication with each BWP including one or more sidelink resource pools, and activate a BWP from the multiple BWPs configured for the sidelink communication.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
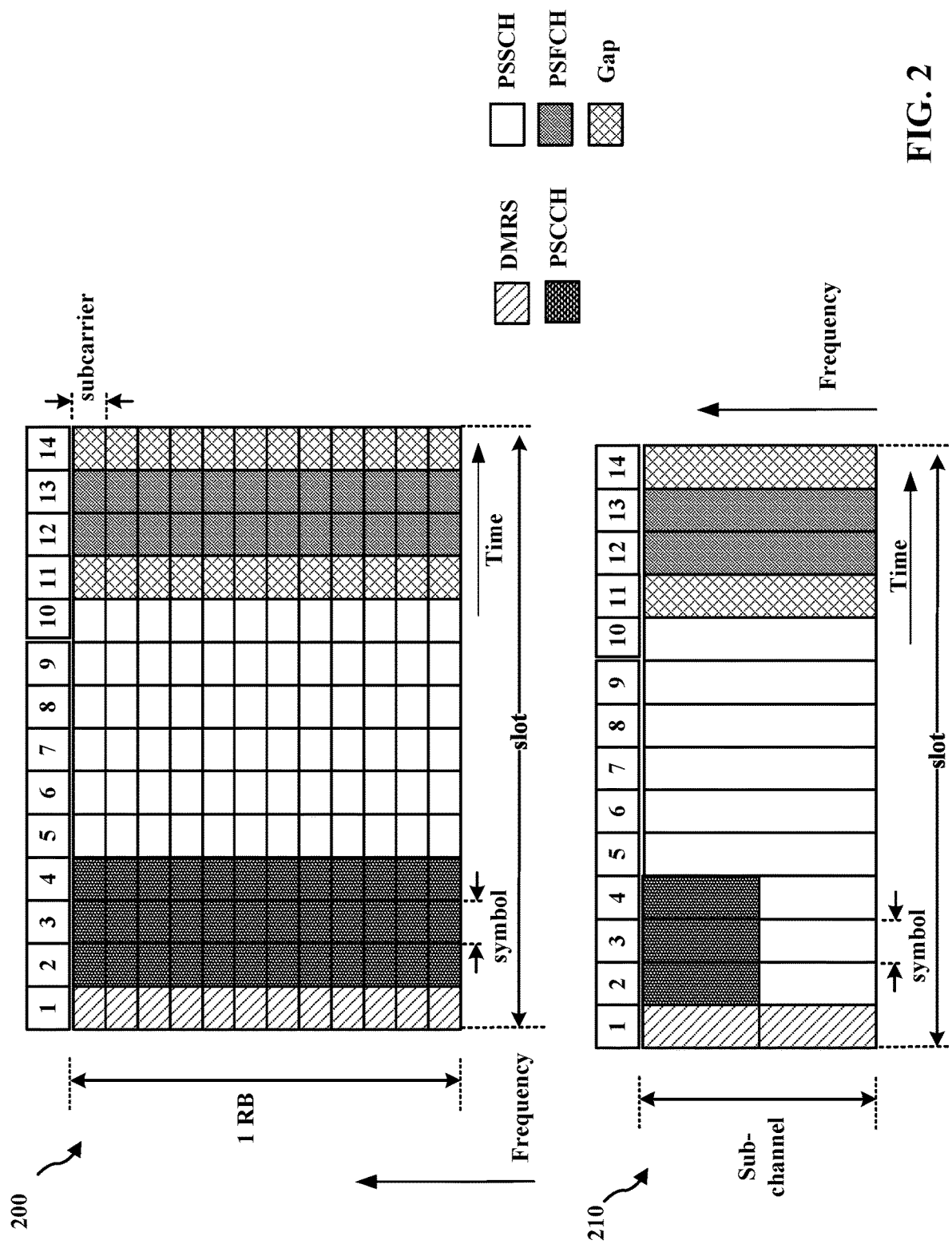
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
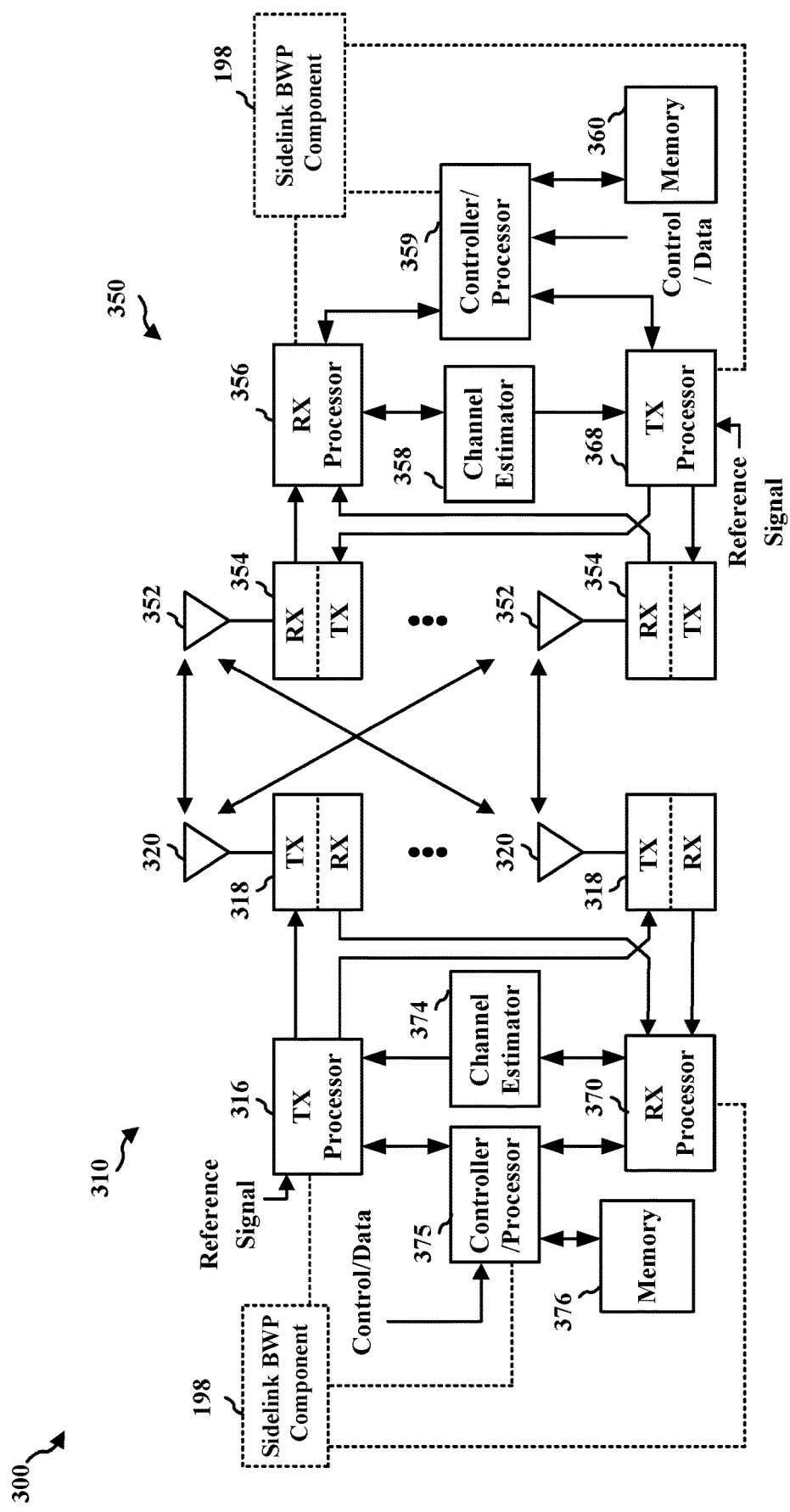
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, the controller/processor 359, the TX processor 316, the RX processor 370, and the controller/processor 375 may include a sidelink BWP component 198 that is configured to perform the aspects described in connection with FIG. 1.

Figure 4:
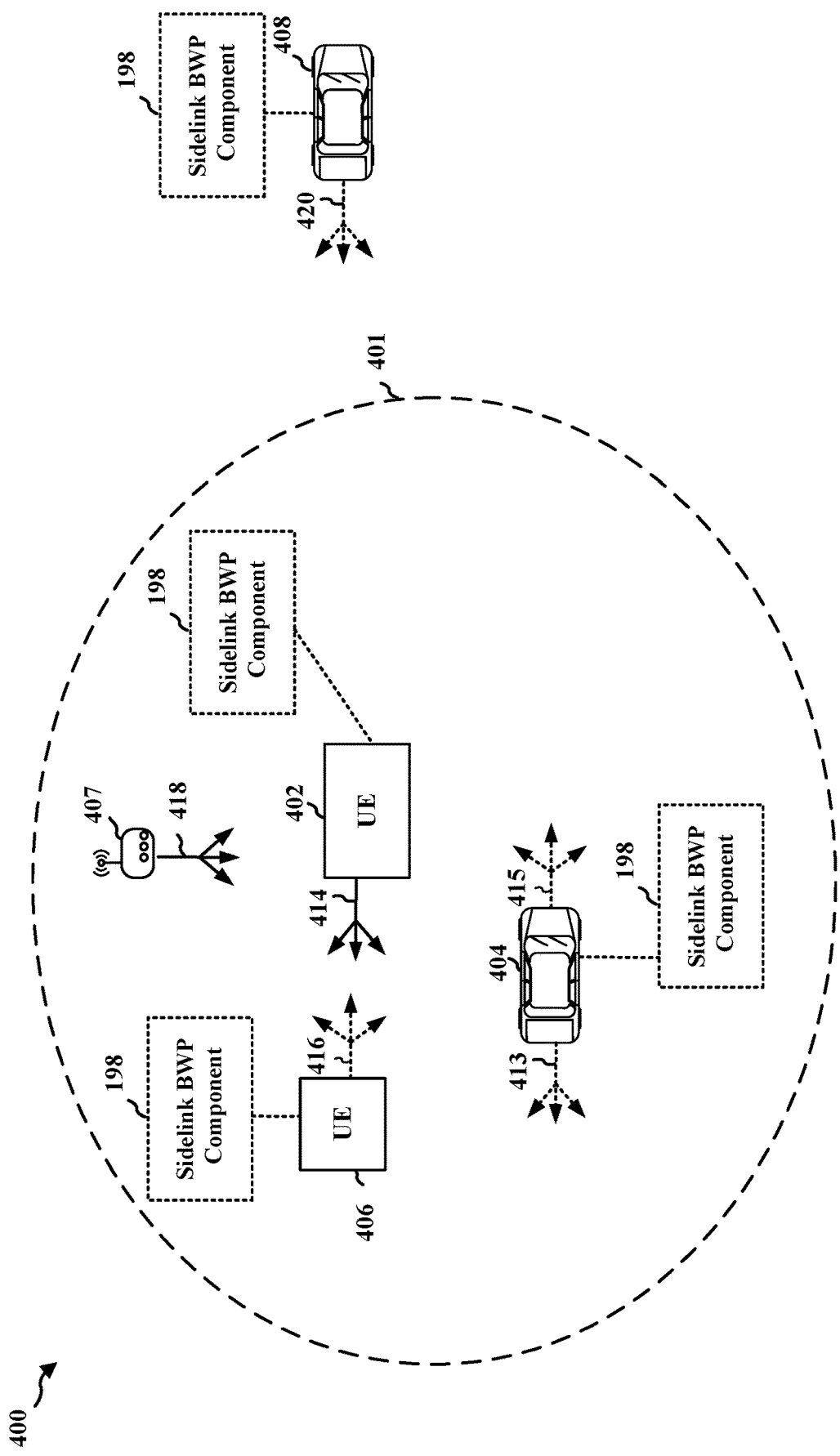
FIG. 4 illustrates an example system based on sidelink communication.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit communication 413, 415 intended for receipt by other UEs within a range 401 of UE 404, and UE 406 may transmit communication 416. Additionally/alternatively, RSU 407 may receive communication from and/or transmit communication 418 to UEs 402, 404, 406, 408.

The UE 402 may provide sidelink control information (SCI) with information for decoding the corresponding data channel. The SCI may also include information that receiving device may use to avoid interference. For example, the SCI may indicate time and frequency resources that will be occupied by the data transmission, may be indicated in a control message from the transmitting device.

Figure 5:
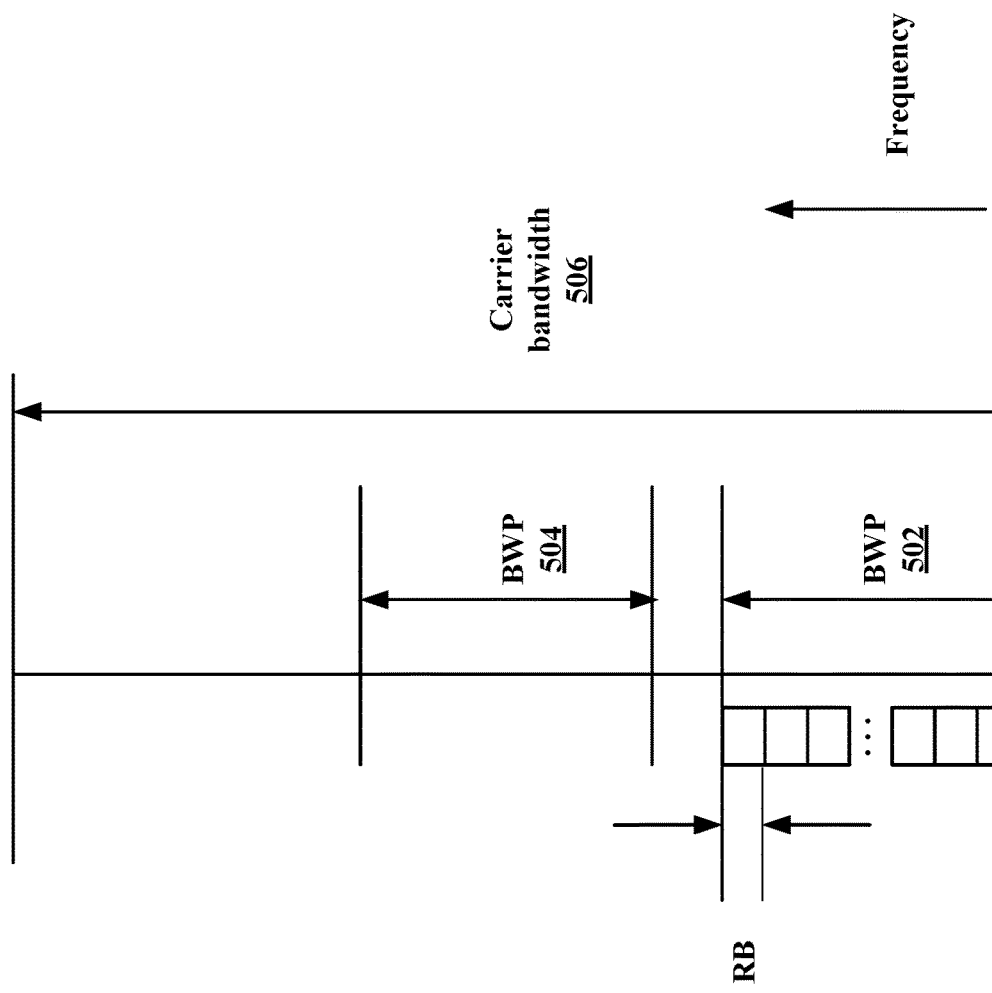
FIG. 5 illustrates an example of frequency resources including multiple BWPs.

In cellular link communication between a base station (e.g., the base station 102 or 180) and a UE (e.g., the UE 104) over a Uu link, the UE may achieve power savings through the use of a configured bandwidth part (BWP) that includes a frequency range that is a portion of a carrier bandwidth. FIG. 5 illustrates an example frequency diagram 500 showing multiple BWPs (e.g., 502 and 504) within a carrier bandwidth 506. Each BWP includes a set of contiguous physical RBs. The active BWP(s) of the UE may change dynamically over time, e.g., depending on a traffic pattern between the UE and the base station. The use of the BWPs may enable a UE to communicate with the base station over a narrower bandwidth, which may use less power at the UE.

Figure 6:
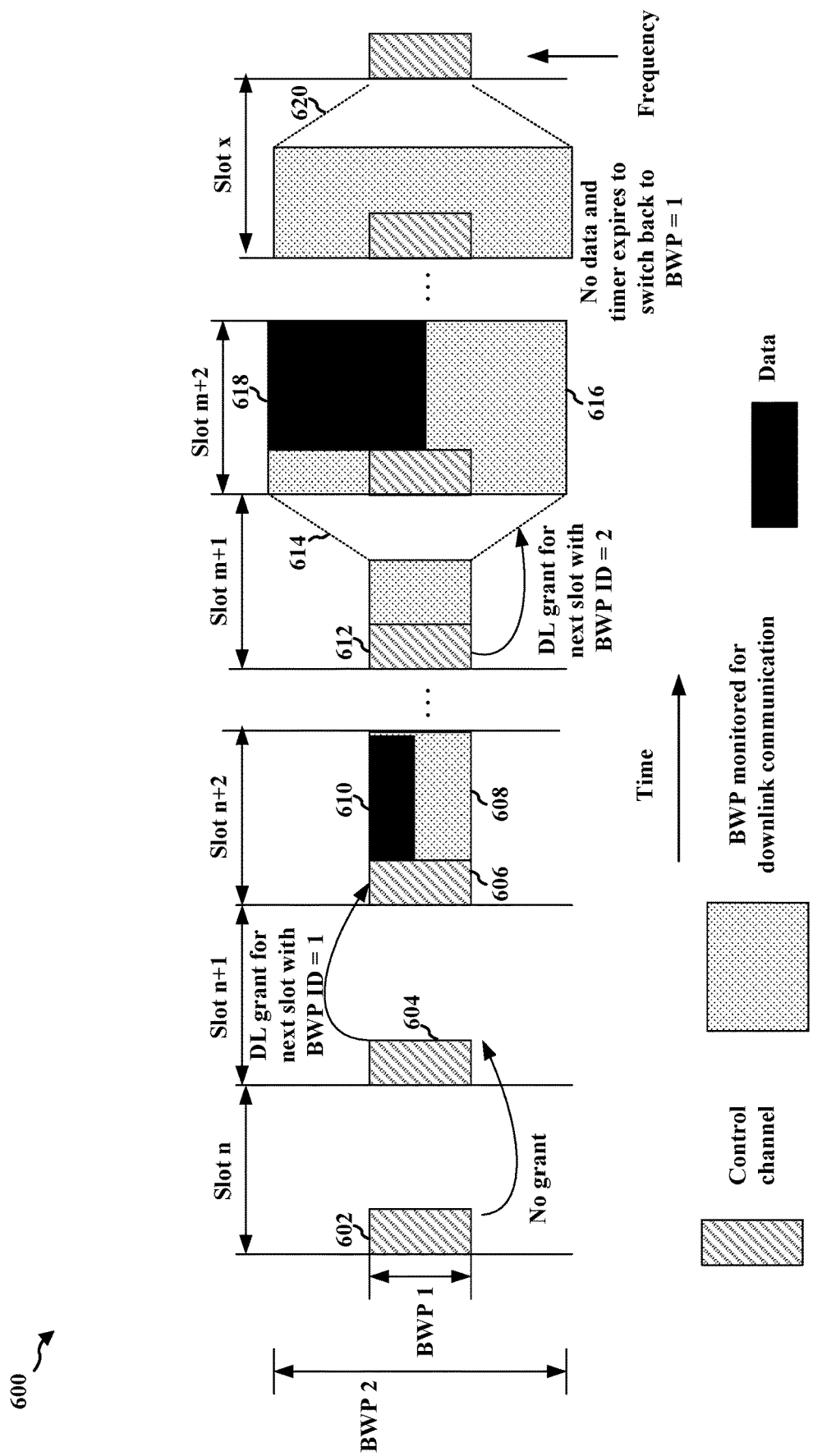
FIG. 6 illustrates example aspects of BWP switching for Uu based communication between a base station and a UE.

FIG. 6 illustrates an example of BWP switching 600 for downlink reception by a UE. The UE may monitor a narrower BWP (e.g., BWP 1) for a control channel transmission 602 from the base station. The control channel 602 does not include a downlink grant for the UE. At a next slot, the UE may receive a downlink grant in the control channel 604, the downlink grant indicating BWP 1. Thus, the UE continues to monitor the narrower bandwidth 608 of BWP 1. The UE may receive a control channel transmission 606 and/or data 610 within the frequency resources of the BWP 1. In another slot, the UE may receive a downlink grant in a control channel transmission 612 that indicates a different BWP, e.g., BWP 2. As illustrated at 614, the UE switches to monitor the indicated BWP, as shown at 616. The UE receives the downlink data 618 on frequency resources of BWP 2. The UE may switch back to monitoring the narrower bandwidth of BWP 1. For example, if the UE has not received data and a timer expires, the UE may switch, at 620, back to monitoring BWP 1.

Figure 7:
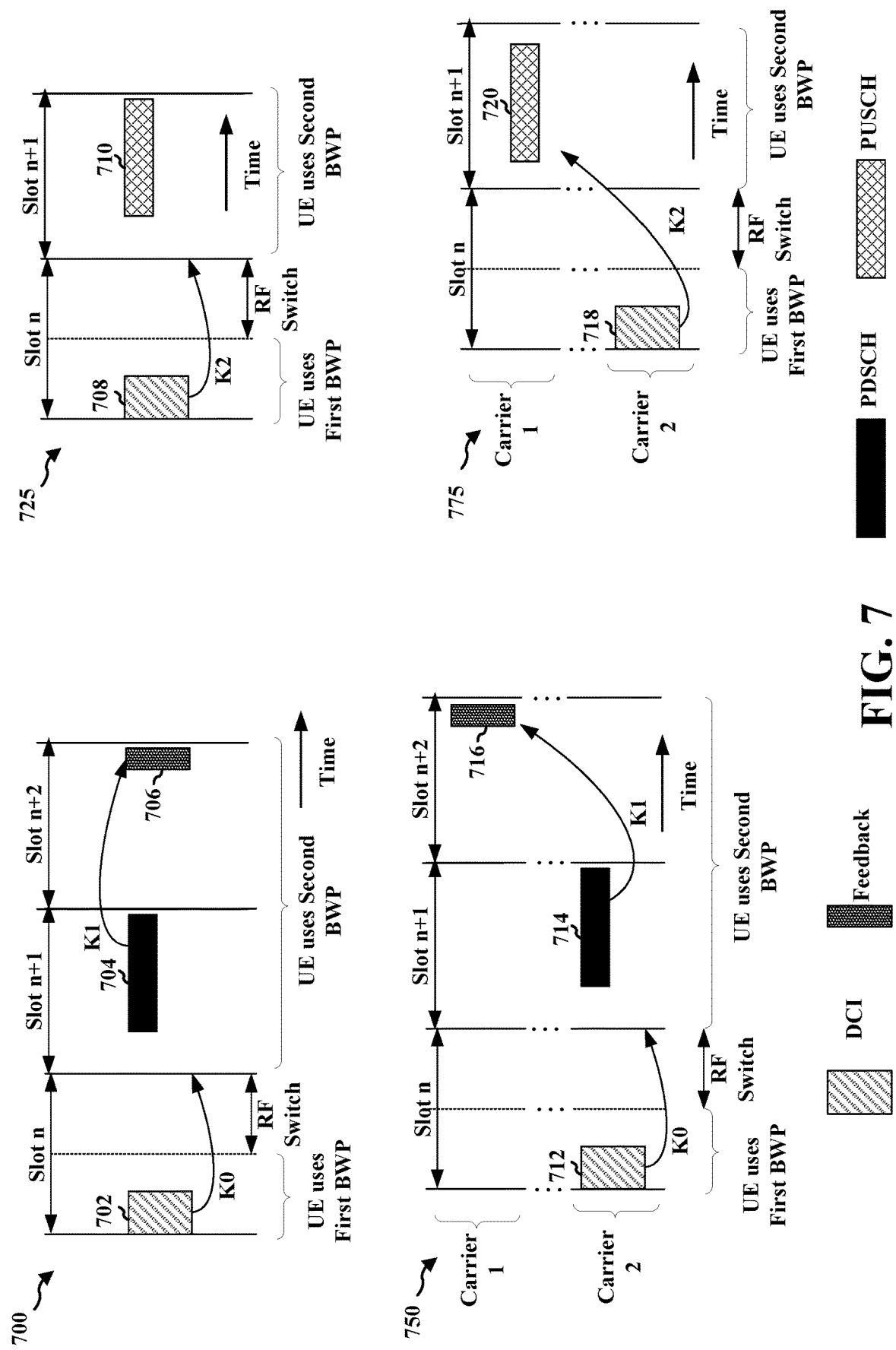
FIG. 7 illustrates example aspects of time division duplex (TDD) BWP switching and frequency division duplex (FDD) BWP switching.

FIG. 7 illustrates examples of BWP switching for downlink and uplink transmissions from a UE. In a downlink TDD example, a UE receives downlink control information (DCI) 702 in a first BWP with a downlink grant for the UE to receive PDSCH 704 in a second BWP. The UE performs a BWP switch from the first BWP to the second BWP in order to receive the PDSCH. The UE then transmits feedback 706 (e.g., ACK/NACK) in the second BWP. The RF switching latency for the UE to switch from the first BWP to the second BWP may be provided for with a delay parameter (e.g., k0) between the DCI and the PDSCH reception. K1 may provide a delay between the PDSCH reception and the feedback 706. In a downlink FDD example 750, a UE receives DCI 712 in a first BWP of a first carrier with a downlink grant for the UE to receive PDSCH 714 in a second BWP of the first carrier. The UE performs a BWP switch from the first BWP to the second BWP for the first carrier in order to receive the PDSCH. The UE then transmits feedback 716 in a different carrier. Similar to the TDD example 700, a delay parameter (e.g., k0) may be configured for a delay between the DCI and the PDSCH reception due to the RF switching latency for the UE to switch from the first BWP to the second BWP. In the examples 700 and 750, the PDSCH may be in the new BWP, e.g., involving a BWP switch from the BWP in which the DCI with the downlink grant is received. In the TDD example 700, the UE may apply a new DL/UL BWP pair, e.g., transmitting the ACK (e.g., feedback 706) in a new uplink BWP. In the FDD example 725, the UE may receive the PDSCH 714 in the new BWP, and may transmit the feedback in a prior uplink BWP.

In the uplink TDD example 725, the UE receives the DCI 708, in a first BWP, with an uplink grant for the UE to transmit the PUSCH 710 in a second BWP. The UE performs a BWP switch from the first BWP to the second BWP in order to transmit the PUSCH. The RF switching latency for the UE to switch from the first BWP to the second BWP may be accommodated by a delay parameter (e.g., k2) for a delay between the DCI and the PUSCH transmission. In the uplink FDD example 775, the UE may be configured for a first BWP for a first carrier. The UE receives the DCI 718, on a second carrier, with an uplink grant for the UE to transmit PUSCH 720 in a second BWP of the first carrier. The UE performs a BWP switch from the first BWP to the second BWP for the first carrier in order to transmit the PUSCH. The RF switching latency for the UE to switch from the first BWP to the second BWP on the first carrier may be accommodated with a delay parameter (e.g., k2) that corresponds to a delay between the DCI and the PUSCH transmission. In the examples 725 and 775, the PUSCH may be transmitted in the new BWP, e.g., involving a BWP switch from the BWP in which the DCI with the uplink grant is received. As illustrated in the FDD examples 750 and 775, the UL and DL BWP may be switched independently.

The size of the DCI in different BWPs may be different due to the different bandwidth sizes of the BWPs. In some examples, a DCI in one BWP may indicate a grant in a different BWP, e.g., which may provide for different bandwidths for the control channel with the grant and the data based on the grant.

Figure 8:
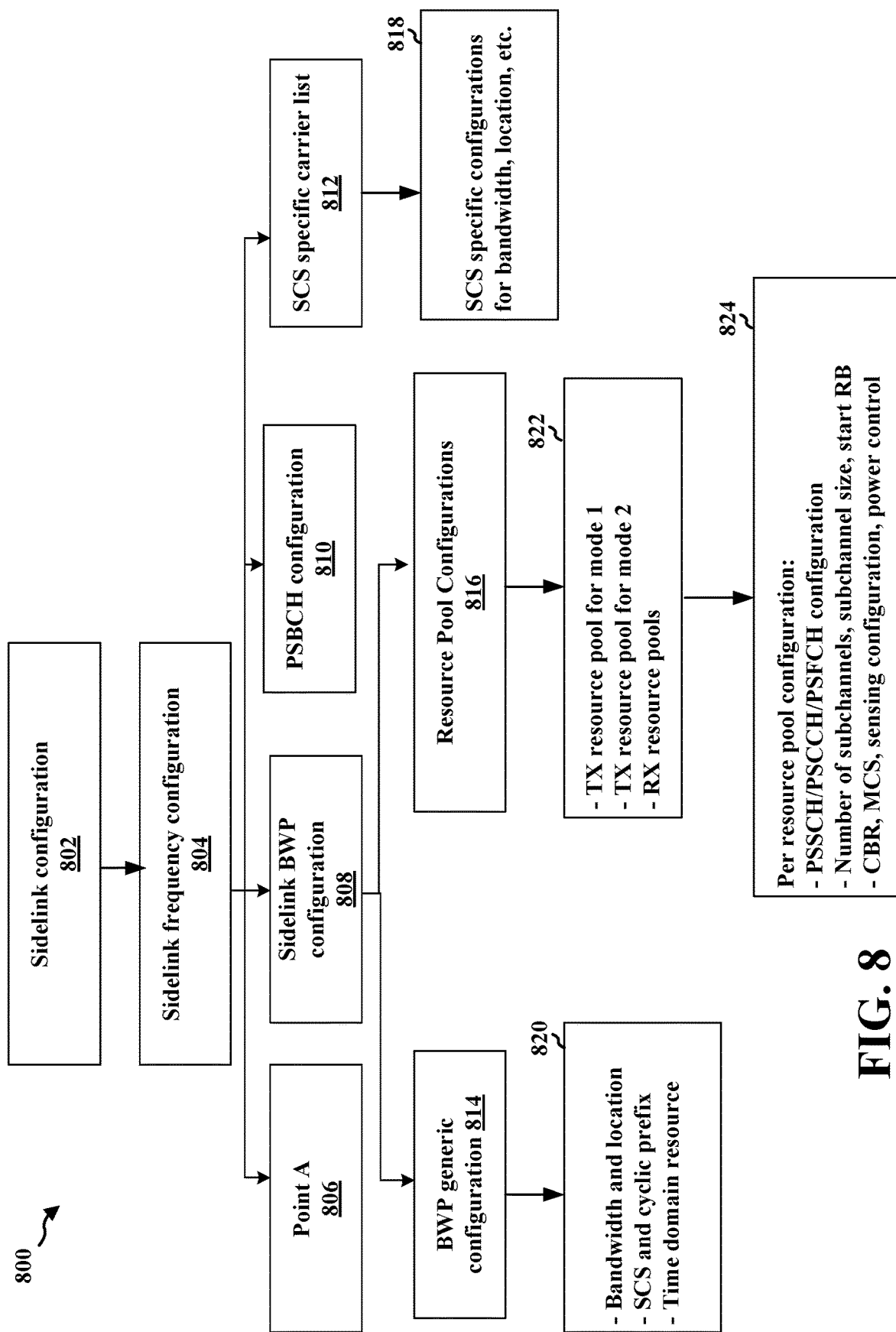
FIG. 8 illustrates an example hierarchy structure for a sidelink configuration include a sidelink BWP configuration.

In some examples, a single BWP may be configured within a sidelink carrier. FIG. 8 illustrates an example hierarchy for a configuration for sidelink communication 800 including a BWP configuration 808. As illustrated in FIG. 8, a sidelink configuration 802 may include a sidelink frequency configuration 804, among other aspects. The sidelink frequency configuration 804 may have aspects that correspond to a carrier configuration in Uu based communication. The sidelink frequency configuration 804 may include a reference point, e.g., point A 806, a physical sidelink broadcast channel (PSBCH) configuration 810, and/or a subcarrier spacing (SCS) specific carrier list 812. The SCS specific carrier list 812 may include SCS specific configurations 818 for bandwidth, location, etc. The sidelink frequency configuration 804 may include a sidelink BWP configuration 808. The BWP configuration 808 may include a generic BWP configuration 814. The generic BWP configuration 814 may include one or more parameters 820 such as a bandwidth and frequency location for the generic BWP, an SCS and cyclic prefix (CP) for the generic BWP, and/or one or more time domain resources for the generic BWP. The sidelink BWP configuration 808 may include one or more resource pool configurations 816. Each resource pool configuration may include one or more resource pools 822 for sidelink communication. A BWP may be wider in the frequency domain than a resource pool, and one BWP may include multiple receiving and transmitting resource pools. For example, FIG. 8 illustrates two transmission resource pools and at least one reception resource pool. As an example, different transmission pools may be configured for different modes of resource allocation. For example, at least one transmission resource pool may be configured for centralized resource allocation (e.g., mode 1 resource allocation in which a base station or other central entity allocates resources to various UEs for sidelink communication). At least one transmission resource pool may be configured for decentralized resource allocation (e.g., mode 2 resource allocation or sensing based resource allocation in which each UE determines its own transmission resources from the resource pool). The resource pools 822 may further include one or more reception resource pools. Each resource pool may include a resource pool configuration 824 that includes a configuration of one or more of a PSSCH, PSCCH, or PSFCH. Each resource pool configuration 824 may include a number of subchannels, subchannel size, starting RB, a code block rate (CBR), modulation and coding scheme (MCS), sensing configuration (e.g., for mode 2 resource allocation), and/or power control configuration, among others. In some examples, reach resource pool configuration may include a maximum number of reception pools and/or transmission pools. For example, a sidelink BWP may include a maximum of 16 reception pools and a maximum of 8 transmission pools.

Aspects presented herein provide for multiple BWPs to be configured for a single sidelink carrier. The BWPs may improve power savings at a sidelink device while also providing different frequency resources for different sidelink communication. Similar to the BWPs for a UU link, having multiple BWPs for a sidelink carrier may enable some sidelink devices to communicate over a narrower bandwidth, which may improve power savings at the sidelink devices. However, sidelink devices that communicate based on overlapping BWPs may cause interference to each other. Aspects presented herein provide for improved coordination for sidelink communication that is based on multiple BWPs.

Figure 9B:
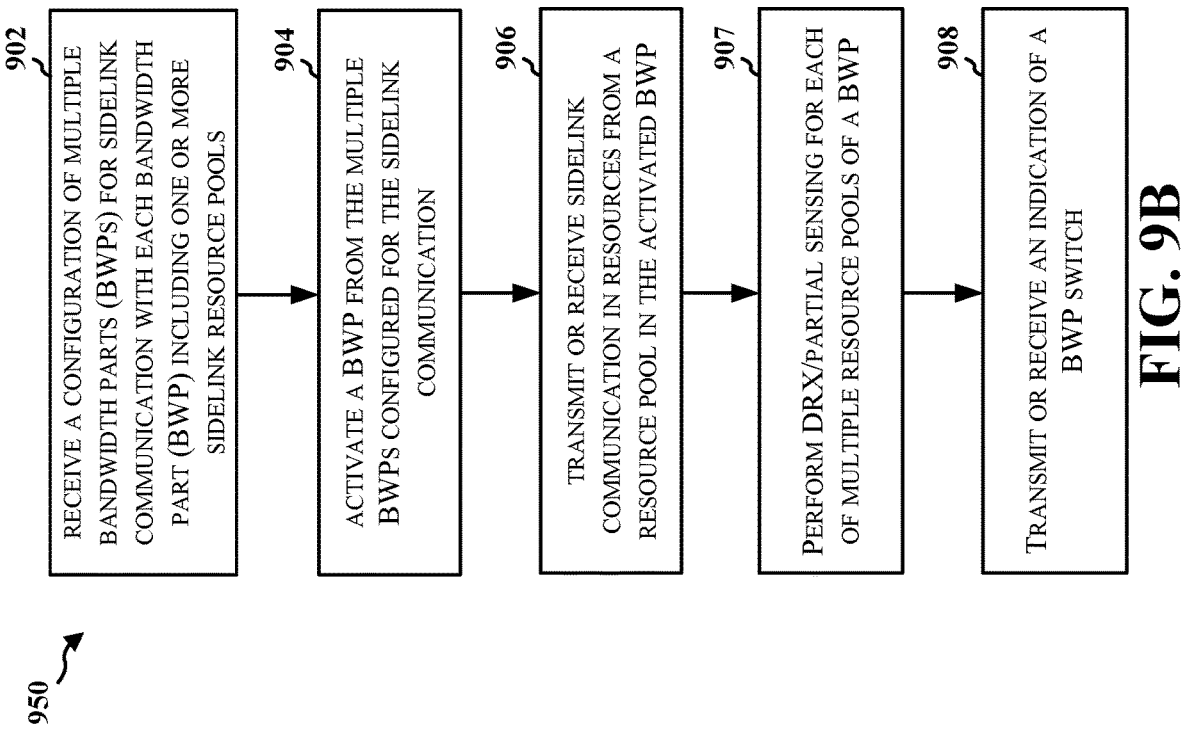
FIGS. 9A and 9B are flowcharts of methods of wireless communication.
Figure 9A:
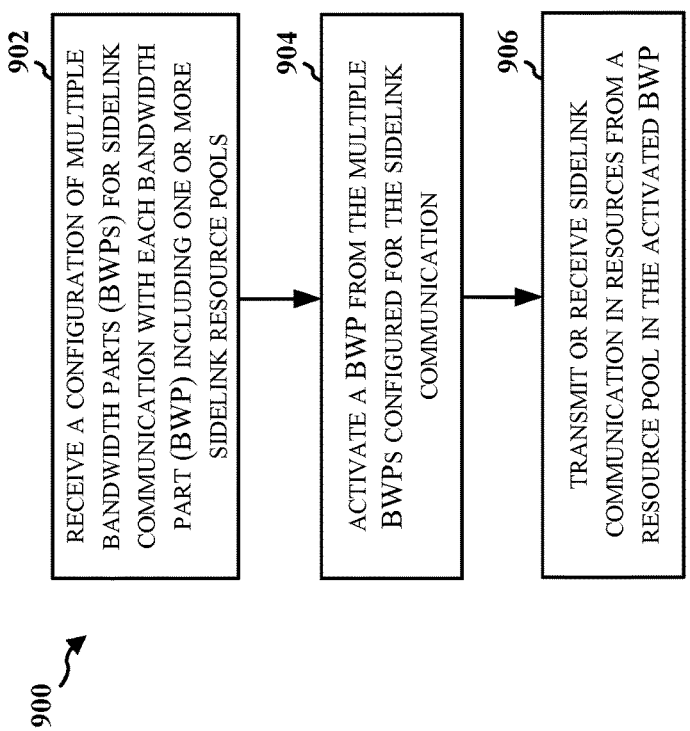

FIG. 9A is a flowchart 900 of a method of wireless communication. The method may be performed by a sidelink device, such as a UE (e.g., the UE 104, 402, the device 350; the apparatus 1302). The method may enable the use of multiple BWPs for a sidelink carrier. The use of multiple BWPs may enable some sidelink devices to communicate based on a narrower frequency range, which may help the sidelink devices to reduce power consumption.

At 902, a configuration of multiple BWPs for sidelink communication is received with each BWP including one or more sidelink resource pools. In one aspect, at least one sidelink resource pool may be shared between two or more BWPs, e.g., as illustrated in any of FIG. 10 or 11. In one example, 902 may be performed by a sidelink BWP configuration component 1340 in FIG. 13. In some examples, a plurality of sidelink resource pools may be configured for a carrier, and each BWP includes one or more configured sidelink resources pools. Thus, the BWP configuration may indicate the resource pools without separately providing a configuration for each resource pool comprised in the BWP. In other examples, a configuration for each of the plurality of BWPs may include a configuration for each of the one or more sidelink resource pools associated with a corresponding BWP.

At 904, a BWP from the multiple BWPs configured for the sidelink communication is activated. For example, a triggering event for the BWP switching may be the change of traffic load among pairs of communication UEs (e.g., when a large amount of data is received at the Tx buffer of the Tx UE). This may indicate to the receiver to switch to a larger BWP, which is similar for the Uu case (i.e., cellular link). In one example, 904 may be performed by the BWP activation component 1342 in FIG. 13.

At 906, sidelink communication in resources from a resource pool in the activated BWP is transmitted or received. In one aspect, the sidelink device monitors for the sidelink communication in the one or more resource pools of the activated BWP and does not monitor for the sidelink communication outside of the one or more resource pools of the activated BWP. In another aspect, the sidelink device selects a resource for transmission of the sidelink communication from the one or more resource pools of the activated BWP. In another aspect, the sidelink device performs a sidelink operation in the one or more resource pools of the activated BWP, the sidelink operation including at least one of: sensing for resource reservations based on a distributed resource allocation mode; transmitting a resource reservation based on the distributed resource allocation mode; transmitting feedback on a PSFCH; congestion control; or providing channel state information (CSI). In another aspect, SCI for each of the one or more resource pools may be based on at least one of a PSCCH configuration, a PSSCH configuration, or a PSFCH configuration for a corresponding resource pool. In one example, 906 may be performed by the sidelink communication component 1348 in FIG. 13. The sidelink device may transmit or receive PSCCH, a PSSCH, or a PSFCH associated with the SCI in the resource pool that is common to the first BWP and the second BWP. The BWP switch may be based on the first BWP and the second BWP having a common resource pool. The sidelink device may select transmission resources from resources based on each transmission resource pool configured for the activated BWP.

A first resource pool of a first BWP and a second resource pool of a second BWP may be for a centralized resource allocation mode, and the first resource pool may at least partially overlap the second resource pool. The sidelink device may refrain from, or skip, decoding sidelink messages on a resource pool of a non-active BWP.

A first resource pool and a second resource pool may be for a distributed resource allocation mode and the first resource pool may fully overlap the second resource pool of a second BWP or does not overlap the second resource pool of the second BWP. The sidelink device may monitor for sidelink messages in each reception resource pool configured for the activated BWP.

FIG. 9B illustrates a flowchart 950 of a method of wireless communication. The method may include aspects that are described in connection with FIG. 9A. Aspects that have been described in connection with FIG. 9A have the same reference number. The method may be performed by a sidelink device, such as a UE (e.g., the UE 104; the apparatus 1302). As illustrated at 908 in FIG. 9B, the sidelink device may further transmit or receive an indication of a BWP switch from a first BWP to a second BWP. The indication of the BWP switch may be transmitted or received in SCI in a resource pool that is common to the first BWP and the second BWP. The indication may be transmitted or received by the BWP switch indication component 1344 of the apparatus 1302. The indication of the BWP switch may be transmitted or received in SCI in a first resource pool of the first BWP and indicates a switch to the second BWP. The indication may be comprised in a MAC-CE. The indication may be transmitted or received in the resource pool associated with BWP indications. The indication may comprise a codepoint that maps to a BWP index of the second BWP.

SCI may indicate a sidelink grant for a sidelink transmission in the first BWP. The sidelink device may switch to the second BWP after a PSFCH associated with the sidelink transmission in the first BWP. A switching time may be defined for the BWP switch from a symbol comprising the feedback for a PSCCH that indicates the BWP switch to a first slot in which resource pools in the second BWP become active. The sidelink device may not be expected to transmit or receive during the switching time, for example if the first BWP and the second BWP do not share a common resource pool. The sidelink device may continue to transmit or receive during the switching time if the first BWP and the second BWP have a common resource pool. The sidelink device may identify a configuration that configures a BWP switching indicator in the SCI associated with the resource pool that is common to the first BWP and the second BWP. The sidelink device may identify a configuration that configures a mapping between each codepoint of a BWP switching field in the SCI associated with the resource pool and one or more of the multiple BWPs.

FIG. 15 illustrates an example timing 1500 of the BWP switch from the first BWP 1502 to the second BWP 1506. The BWP switching indication may be included in the SCI of the first BWP 1502. As shown in FIG. 15, the switching time 1504 occurs after the SCI and scheduled PSSCH (i.e., data) and ACK. This is in contrast to the BWP switching for the downlink and uplink transmissions from a UE, shown in FIG. 7, in which the BWP switching occurs before the data and ACK.

If a first BWP and a second BWP on a sidelink carrier have a common resource pool, the first BWP and the second BWP have one or more of: a SCS, a same CP configuration, time allocation based on a same starting symbol and symbol length, or common transmission occasions for a PSFCH. The first BWP and the second BWP may have the common transmission occasions for the PSFCH, wherein each resource pool of the first BWP and the second BWP are configured with a common PSFCH transmission period and slot offset.

Figure 14:
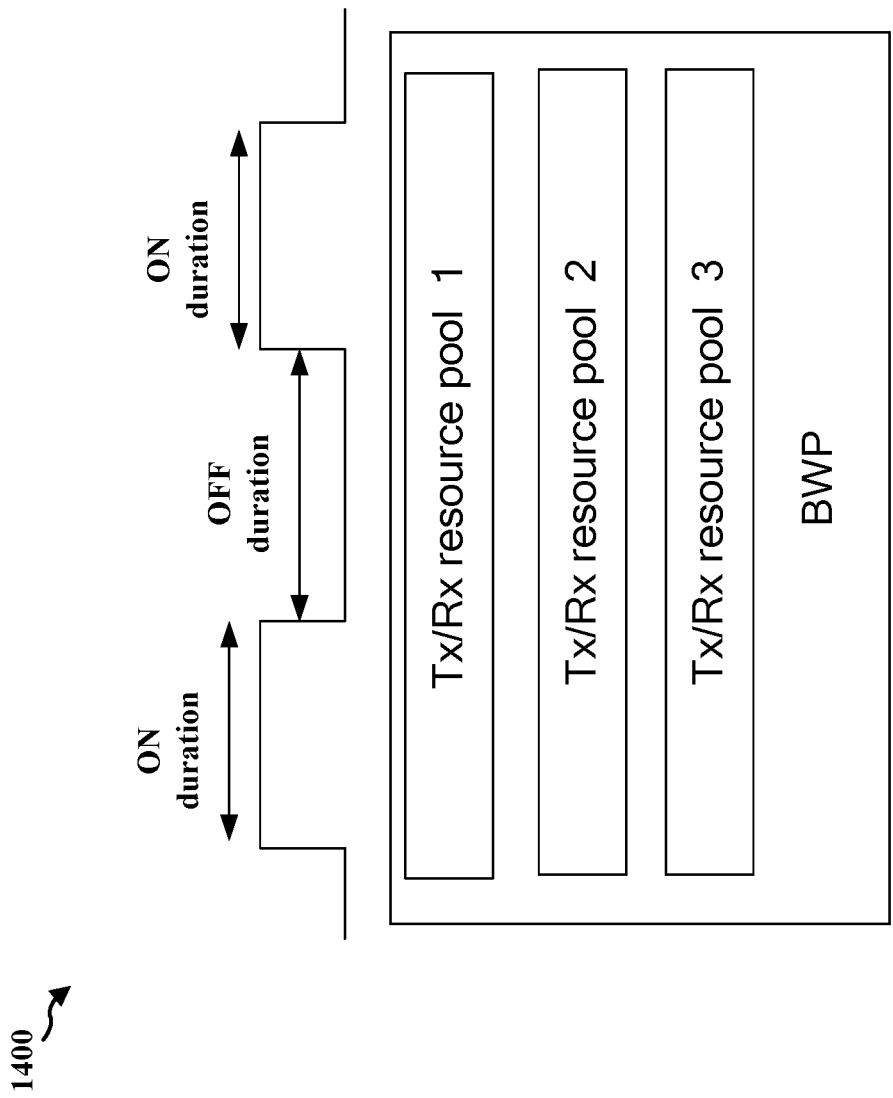
FIG. 14 is a diagram of discontinuous reception (DRX) or partial sensing applied to multiple resource pools of a BWP.

The activated BWP may include multiple resource pools, and the sidelink device may perform discontinuous reception (DRX) or partial sensing for each of the multiple resource pools of the activated BWP, as illustrated at 907 in FIG. 9B. FIG. 14 illustrates an example of a DRX/partial sensing pattern applied to multiple resource pools of a BWP. The sidelink device may apply a same DRX pattern for each of the multiple resource pools of the activated BWP. The sidelink device may apply a same partial sensing pattern for each of the multiple resource pools of the activated BWP. The DRX or partial sensing may be performed by a low power component 1346 of the apparatus 1302.

Figure 10:
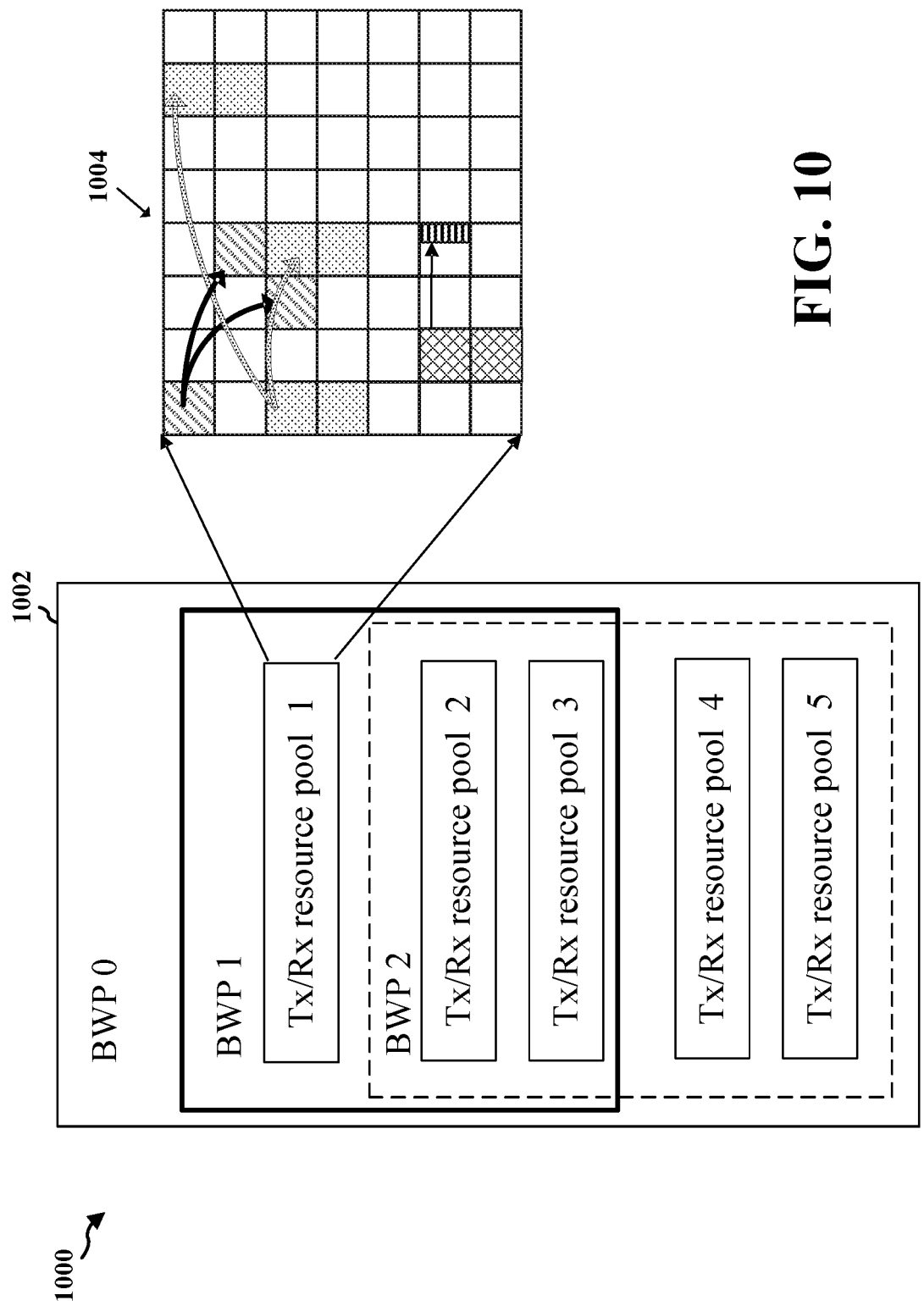
FIG. 10 illustrates a configuration of multiple BWPs in a carrier for sidelink communication using multiple resource pools.

FIG. 10 illustrates a configuration 1000 of multiple BWPs in a carrier 1002 for sidelink communication using multiple resource pools. In one aspect, a plurality of sidelink resource pools may be configured for the carrier 1002. Each BWP may include one or more configured sidelink resources pools. In another aspect, a configuration for each of the plurality of BWPs includes a configuration for each of the one or more sidelink resource pools associated with a corresponding BWP.

In the configuration 1000 of FIG. 10, three BWPs (BWP 0, BWP 1, BWP 2) and five resource pools (1, 2, 3, 4, 5) are used. In FIG. 10, BWP 0 includes resource pools 1-5, BWP 1 includes resource pools 1-3, and BWP 2 includes resource pools 2-5. As indicated above, a resource pool may be shared between two or more BWPs. Thus, resource pool 1 is shared between BWP 0 and BWP 1, resource pools 2-5 are shared between BWP 0 and BWP 2, and resource pools 2-3 are shared between BWP 0, BWP 1, and BWP 2. In the configuration 1000 of FIG. 10, sidelink communications between the sidelink devices described in 906 occur in resources from a resource pool 1004 (i.e., resource pool 1) in the activated BWP.

In the configuration 1000 of FIG. 10, an indication of a BWP switch from a first BWP to a second BWP may be transmitted or received by the sidelink device. The indication of the BWP switch may be transmitted or received in SCI in a resource pool that is common to the first BWP and the second BWP. In one aspect, one or more of a PSCCH, a PSSCH, or a PSFCH associated with the SCI are transmitted or received in the resource pool that is common to the first BWP and the second BWP. In another aspect, the BWP switch may be based on the first BWP and the second BWP having a common resource pool. For example, the indication of the BWP switching from the first BWP to the second BWP may be transmitted in the common resource pool, e.g., rather than being transmitted in a resource pool that is not common to both BWPs.

Figure 11A:
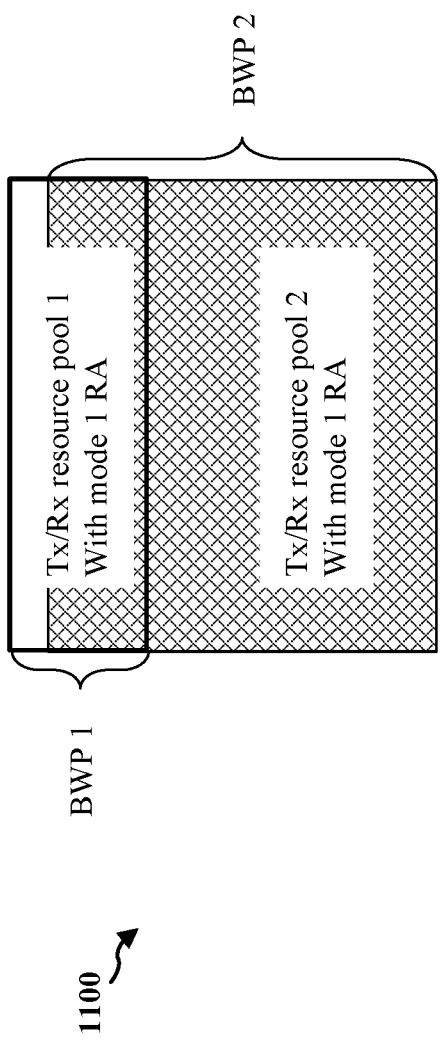
FIG. 11A illustrates an example of two resource pools, each with a centralized resource allocation (RA) mode (i.e., Mode 1 RA).
Figure 11B:
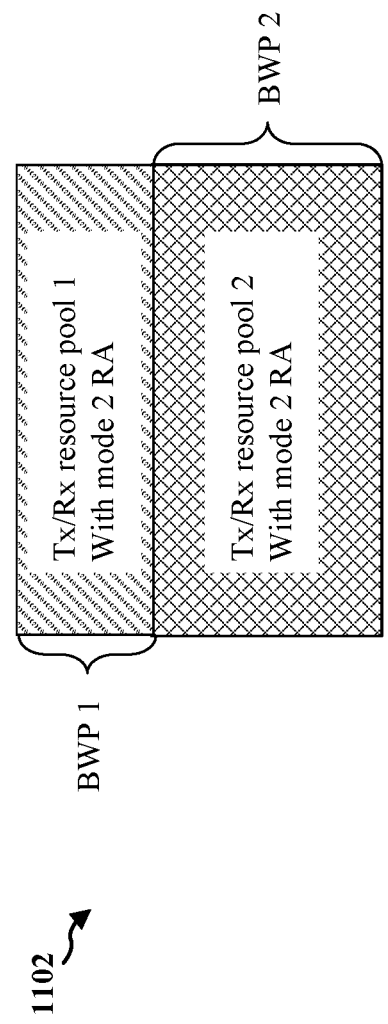
FIG. 11B illustrates an example of two resource pools, each with a distributed RA mode (i.e., Mode 2 RA).

FIGS. 11A and 11B illustrate two modes of resource allocation for managing overlapping resource pools.

FIG. 11A illustrates an example 1100 of two resource pools, each with a centralized resource allocation (RA) mode (i.e., Mode 1 RA, e.g., in which a base station allocates resources to the UE for sidelink transmissions). In FIG. 11A, each resource pool (resource pool 1 or resource pool 2) may reside in a different BWP (BWP 1 or BWP 2). Further, the two resource pools may overlap at least partially. In FIG. 11A, in which resource pools partially overlap, the sidelink device refrains from decoding sidelink messages on a resource pool of a non-active BWP.

FIG. 11B illustrates an example 1102 of two resource pools, each with a distributed RA mode (i.e., Mode 2 RA or sensing based RA). In FIG. 11B, each resource pool (resource pool 1 or resource pool 2) may reside in same or different BWP (BWP 1 or BWP 2). The first resource pool (resource pool 1) may fully overlap the second resource pool (resource pool 2) of a second BWP (BWP 2) or the first resource pool may not overlap the second resource pool (resource pool 2) of the second BWP (BWP 2). Further, the two sidelink resource pools configured with mode 2 resource allocation may not partially overlap. In one aspect, the sidelink device monitors for sidelink messages in each reception resource pool configured for the activated BWP. In another aspect, the sidelink device selects transmission resources from resources based on each transmission resource pool configured for the activated BWP.

Figure 12:
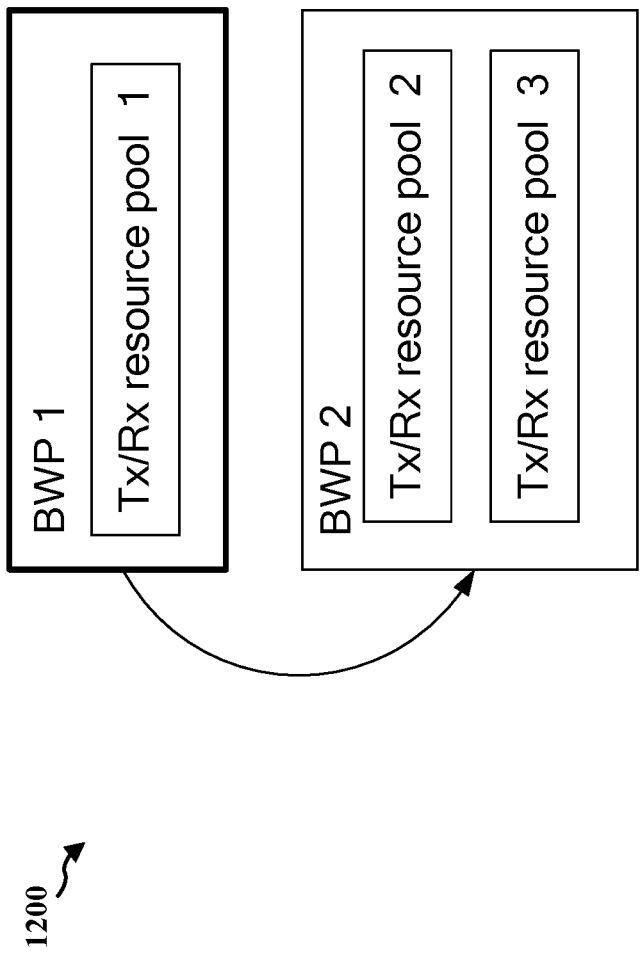
FIG. 12 illustrates an example of the BWP switch between nonoverlapping BWPs or partially overlapping BWPs.

FIG. 12 illustrates an example 1200 of the BWP switch between nonoverlapping BWPs or partially overlapping BWPs. In FIG. 12, the BWP switch is between BWP 1 and BWP 2. Thus, the indication of the BWP switch between BWP 1 and BWP 2 may be transmitted or received in SCI in a first resource pool of the first BWP and indicates a switch to the second BWP. In one aspect, the indication is comprised in a MAC-CE. In another aspect, the indication is transmitted or received in the resource pool associated with BWP indications. In yet another aspect, the indication includes a codepoint that maps to a BWP index of the second BWP. In yet another aspect, the SCI indicates a sidelink grant for a sidelink transmission in the first BWP. In yet another aspect, the sidelink device switches to the second BWP after a PSFCH associated with the sidelink transmission in the first BWP. In yet another aspect, a switching time is defined for the BWP switch from a symbol comprising the feedback for a PSCCH that indicates the BWP switch to a first slot in which resource pools in the second BWP become active. In yet another aspect, the sidelink device is not expected to transmit or receive during the switching time, if the first BWP and the second BWP do not share a common resource pool. In yet another aspect, the sidelink device continues to transmit or receive during the switching time if the first BWP and the second BWP have a common resource pool. In a further aspect, a configuration that configures a BWP switching indicator may be identified in the SCI associated with the resource pool that is common to the first BWP and the second BWP. For each of the resource pools contained in a BWP, the UE may be configured whether to include a BWP switching indicator in the corresponding SCI associated with the resource pool. In one case, the BWP switching indicator may be configured in the common resource pools between multiple BWPs, e.g., rather than in a resource pool that is not common to the BWPs involved in the BWP switch. In a further aspect, a configuration that configures a mapping between each codepoint of a BWP switching field may be identified in the SCI associated with the resource pool and one or more of the multiple BWPs. Thus, the configuration may be configured for each resource pool of the resource pools in each BWP. For example, the mapping may be part of the configuration 824 for each resource pool described in connection with FIG. 8.

In one aspect, if a first BWP and a second BWP on a sidelink carrier have at least one common resource pool, the first BWP and the second BWP have one or more of: a same SCS; a same CP configuration; time allocation based on a same starting symbol and symbol length, or common transmission occasions for a PSFCH. The first BWP and the second BWP may have the common transmission occasions for the PSFCH, and each resource pool of the first BWP and the second BWP may be configured with a common PSFCH transmission period and slot offset.

In one case, where the activated BWP includes multiple resource pools, discontinuous reception (DRX) may be performed for each of the multiple resource pools of the activated BWP. In one aspect, the sidelink device applies a same DRX pattern for each of the multiple resource pools of the activated BWP.

In another case, where the activated BWP includes multiple resource pools, partial sensing is performed for each of the multiple resource pools of the activated BWP. In one aspect, the sidelink device applies a same partial sensing pattern for each of the multiple resource pools of the activated BWP.

FIG. 14 illustrates an example low power mode 1400 that includes a pattern of ON durations and OFF durations. The pattern may be a DRX pattern with DRX ON durations and DRX OFF durations that are applied to each of resource pools 1, 2, and 3 of the BWP. In some examples, the pattern may be a partial sensing pattern with OFF durations during which the UE is not performing sensing for sidelink messages and ON durations during which the UE performs sensing for sidelink reservations. Both low power modes enable the UE to perform discontinuous reception/sensing for a resource pool over some periods of time. As illustrated in FIG. 14, in a BWP with multiple resource pools, the UE may apply DRX/partial sensing jointly for each resource pool of the BWP.

Figure 13:
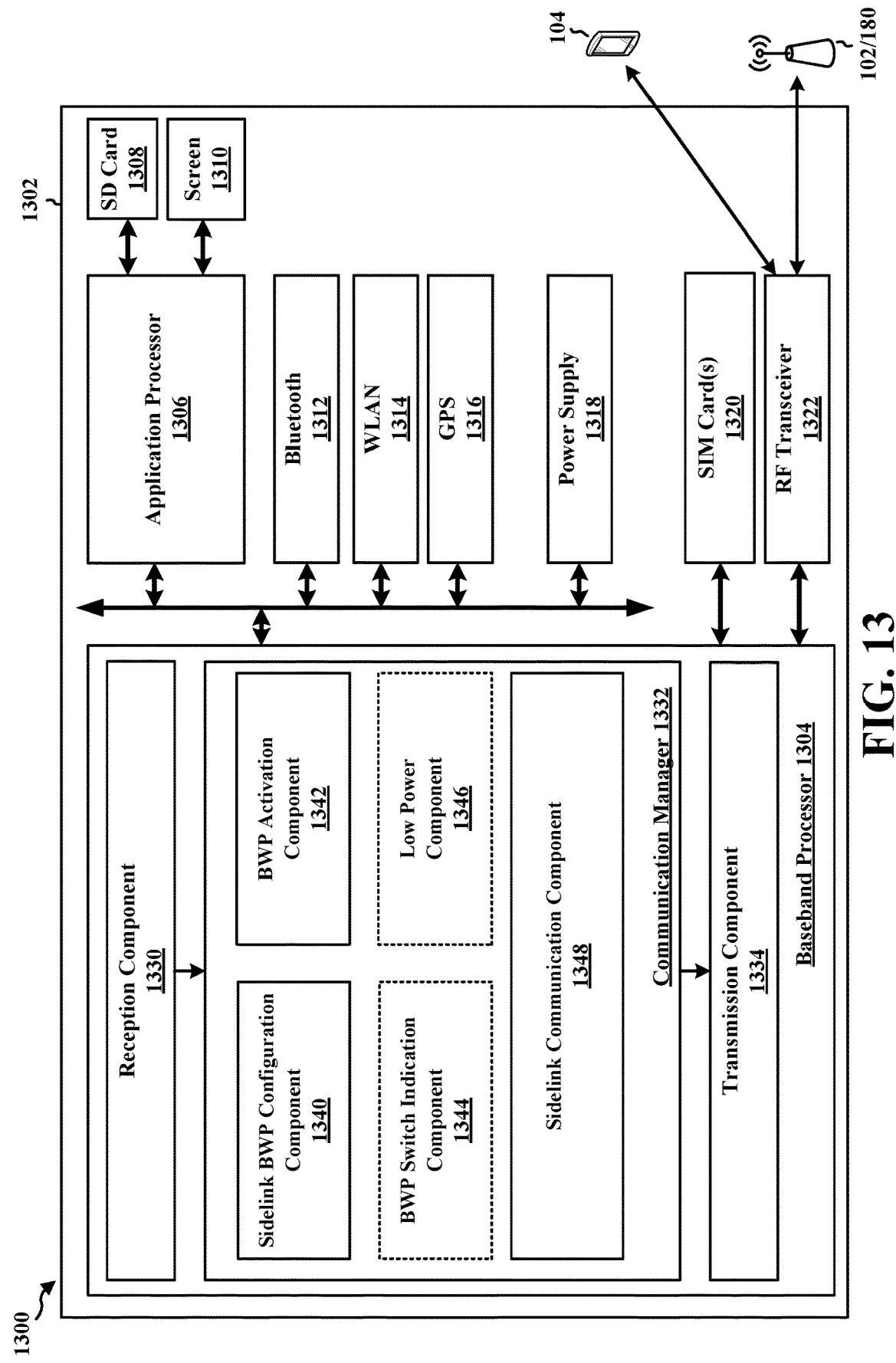
FIG. 13 is a diagram illustrating an example of a hardware implementation for an apparatus for wireless communication.

FIG. 13 is a diagram 1300 illustrating an example of a hardware implementation for an apparatus 1302 for wireless communication. The apparatus 1302 is a device that supports sidelink communication. In some aspects, the apparatus 1302 may be a UE, a component of a UE, or may implement UE functionality. The apparatus 1302 may include a baseband processor 1304 (also referred to as a modem) that may be coupled to an RF transceiver 1322. In some aspects, the apparatus 1302 may include one or more of a subscriber identity modules (SIM) card 1320, an application processor 1306 coupled to a secure digital (SD) card 1308 and a screen 1310, a Bluetooth module 1312, a wireless local area network (WLAN) module 1314, a Global Positioning System (GPS) module 1316, and/or a power supply 1318. The baseband processor 1304 communicates through the RF transceiver 1322 with the UE 104 and/or BS 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described supra. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire wireless device (e.g., see 350 of FIG. 3) and include the additional modules of the apparatus 1302.

The communication manager 1332 includes a sidelink BWP configuration component 1340 that is configured to receive a configuration of multiple BWPs for sidelink communication with each BWP including one or more sidelink resource pools, and/or activate a BWP from the multiple BWPs configured for the sidelink communication, e.g., as described in connection with 902 and 904 in FIG. 9A or 9B. The communication manager 1332 includes a transmission component 1334 and a reception component 1330, that are configured to transmit or receive the sidelink communication in the resources from the resource pool of the activated BWP once the sidelink BWP configuration component 1340 receives the configuration and activates the BWP, e.g., as described in connection with 906 in FIG. 9A or 9B.

The apparatus may include additional components that perform the algorithm in the flowchart and illustrations of FIGS. 9A-12. As such, each block in the flowchart and illustrations of FIGS. 9A-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband processor 1304, includes means for receiving a configuration of multiple BWPs for sidelink communication, each BWP including one or more sidelink resource pools; means for activating a BWP from the multiple BWPs configured for the sidelink communication; and means for transmitting or receiving sidelink communication in resources from a resource pool in the activated BWP. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and aspects thereof may be combined with aspects of other embodiments or teaching described herein, without limitation.

Aspect 1 is a method of wireless communication at a sidelink device, comprising: receiving a configuration of multiple BWPs for sidelink communication, each BWP comprising one or more sidelink resource pools; activating a BWP from the multiple BWPs configured for the sidelink communication; and transmitting or receiving sidelink communication in resources from a resource pool in the activated BWP.

In aspect 2, the method of aspect 1 further includes that at least one sidelink resource pool is shared between two or more BWPs.

In aspect 3, the method of any of aspects 1-2 further comprising monitoring for the sidelink communication in the one or more resource pools of the activated BWP and skipping monitoring for the sidelink communication outside of the one or more resource pools of the activated BWP.

In aspect 4, the method of any of aspects 1-3 further comprising selecting a resource for transmission of the sidelink communication from the one or more resource pools of the activated BWP.

In aspect 5, the method of any of aspects 1-4 further includes performing a sidelink operation in the one or more resource pools of the activated BWP, the sidelink operation including at least one of: sensing for resource reservations based on a distributed resource allocation mode, transmitting a resource reservation based on the distributed resource allocation mode, transmitting feedback on a PSFCH, congestion control, or providing CSI.

In aspect 6, the method of any of aspects 1-5 further includes that SCI for each of the one or more resource pools is based on at least one of a PSCCH configuration, a PSSCH configuration, or a PSFCH configuration for a corresponding resource pool.

In aspect 7, the method of any of aspects 1-6 further includes that a plurality of sidelink resource pools is configured for a carrier, and each BWP includes one or more configured sidelink resources pools.

In aspect 8, the method of any of aspects 1-7 further includes that a configuration for each of the plurality of BWPs includes a configuration for each of the one or more sidelink resource pools associated with a corresponding BWP.

In aspect 9, the method of any of aspects 1-8 further includes that a first resource pool of a first BWP and a second resource pool of a second BWP are for a centralized resource allocation mode and the first resource pool at least partially overlaps the second resource pool.

In aspect 10, the method of any of aspects 1-9 further includes skipping decoding at least one sidelink message on a resource pool of a non-active BWP.

In aspect 11, the method of any of aspects 1-8 further includes that a first resource pool and a second resource pool are for a distributed resource allocation mode and the first resource pool fully overlaps the second resource pool of a second BWP or does not overlap the second resource pool of the second BWP.

In aspect 12, the method of any of aspects 1-11 further includes monitoring for sidelink messages in each reception resource pool configured for the activated BWP.

In aspect 13, the method of any of aspects 1-12 further includes selecting transmission resources from resources based on each transmission resource pool configured for the activated BWP.

In aspect 14, the method of any of aspects 1-13 further includes transmitting or receiving an indication of a BWP switch from a first BWP to a second BWP.

In aspect 15, the method of any of aspects 1-14 further includes that the indication of the BWP switch is transmitted or received in SCI in a resource pool that is common to the first BWP and the second BWP.

In aspect 16, the method of any of aspects 1-15 further includes one or more of a PSCCH, a PSSCH, or a PSFCH associated with the SCI are transmitted or received in the resource pool that is common to the first BWP and the second BWP.

In aspect 17, the method of any of aspects 1-16 further includes that the BWP switch is based on the first BWP and the second BWP having a common resource pool.

In aspect 18, the method of any of aspects 1-13 further includes that the indication of the BWP switch is transmitted or received in SCI in a first resource pool of the first BWP and indicates a switch to the second BWP.

In aspect 19, the method of any of aspects 1-18 further includes that the indication is comprised in a MAC-CE.

In aspect 20, the method of any of aspects 1-19 further includes that the indication is transmitted or received in the resource pool associated with BWP indications.

In aspect 21, the method of any of aspects 1-20 further includes that the indication comprises a codepoint that maps to a BWP index of the second BWP.

In aspect 22, the method of any of aspects 1-21 further includes that the SCI indicates a sidelink grant for a sidelink transmission in the first BWP.

In aspect 23, the method of any of aspects 1-22 further includes that the sidelink device switches to the second BWP after a PSFCH associated with the sidelink transmission in the first BWP.

In aspect 24, the method of any of aspects 1-23 further includes that a switching time is defined for the BWP switch from a symbol comprising the feedback for a PSCCH that indicates the BWP switch to a first slot in which resource pools in the second BWP become active.

In aspect 25, the method of any of aspects 1-24 further includes that the sidelink device is not expected to transmit or receive during the switching time, if the first BWP and the second BWP do not share a common resource pool.

In aspect 26, the method of any of aspects 1-25 further including continuing to transmit or receive during the switching time if the first BWP and the second BWP have a common resource pool.

In aspect 27, the method of any of aspects 1-26 further includes identifying a configuration that configures a BWP switching indicator in the SCI associated with the resource pool that is common to the first BWP and the second BWP.

In aspect 28, the method of any of aspects 1-27 further includes identifying a configuration that configures a mapping between each codepoint of a BWP switching field in the SCI associated with the resource pool and one or more of the multiple BWPs.

In aspect 29, the method of any of aspects 1-28 further includes that if a first BWP and a second BWP on a sidelink carrier have a common resource pool, the first BWP and the second BWP have one or more of: a same SCS, a same CP configuration, time allocation based on a same starting symbol and symbol length, or common transmission occasions for a PSFCH.

In aspect 30, the method of any of aspects 1-29 further includes that the first BWP and the second BWP have the common transmission occasions for the PSFCH, wherein each resource pool of the first BWP and the second BWP are configured with a common PSFCH transmission period and slot offset.

In aspect 31, the method of any of aspects 1-30 further includes that the activated BWP includes multiple resource pools, and further includes performing DRX for each of the multiple resource pools of the activated BWP.

In aspect 32, the method of any of aspects 1-31 further includes applying a same DRX pattern for each of the multiple resource pools of the activated BWP.

In aspect 33, the method of any of aspects 1-32 further includes that the activated BWP includes multiple resource pools, and further includes performing partial sensing for each of the multiple resource pools of the activated BWP.

In aspect 34, the method of any of aspects 1-33 further includes applying a same partial sensing pattern for each of the multiple resource pools of the activated BWP.

Aspect 35 is an apparatus including means to perform the method of any of aspects 1-34.

In aspect 36, the apparatus of aspect 35 further includes at least one antenna and a transceiver coupled to the at least one antenna.

Aspect 37 is an apparatus for wireless communication at a sidelink device including: a memory; and at least one processor coupled to the memory and configured to perform the method of any of aspects 1-34.

In aspect 38, the apparatus of aspect 37 further includes at least one antenna and a transceiver coupled to the at least one antenna and the at least one processor.

Aspect 37 is a non-transitory computer-readable medium storing computer executable code for wireless communication at a sidelink device, the code when executed by a processor cause the processor to perform the method of any of aspect 1-34.

What is claimed is:

1. A method of wireless communication at a sidelink device, comprising:
   receiving a configuration of multiple bandwidth parts (BWPs) for sidelink communication, each bandwidth part (BWP) comprising one or more sidelink resource pools;
   activating a BWP from the multiple BWPs configured for the sidelink communication;
   transmitting or receiving the sidelink communication in resources from a resource pool in the activated BWP;
   transmitting or receiving sidelink control information (SCI) in a first BWP comprising an indication of a BWP switch from the first BWP to a second BWP, the SCI indicating a sidelink grant for a sidelink transmission in the first BWP; and
   switching to the second BWP in response to the indication of the BWP switch and after a physical sidelink feedback channel (PSFCH) associated with the sidelink transmission in the first BWP, wherein a switching time is defined for the BWP switch from a symbol comprising feedback for a physical sidelink control channel (PSCCH) that indicates the BWP switch to a first slot in which resource pools in the second BWP become active.

2. The method of claim 1, wherein at least one sidelink resource pool is shared between two or more BWPs.

3. The method of claim 1, further comprising:
   monitoring for the sidelink communication in the one or more sidelink resource pools of the activated BWP; and
   skipping monitoring for the sidelink communication outside of the one or more sidelink resource pools of the activated BWP.

4. The method of claim 1, further comprising:
   performing a sidelink operation in the one or more sidelink resource pools of the activated BWP, the sidelink operation including at least one of:
      selecting a resource for transmission of the sidelink communication from the one or more sidelink resource pools of the activated BWP,
      sensing for resource reservations based on a distributed resource allocation mode,
      transmitting a resource reservation based on the distributed resource allocation mode,
      transmitting the feedback on the PSFCH,
      performing congestion control, or
      providing channel state information (C SI).

5. The method of claim 1, wherein a plurality of sidelink resource pools is configured for a carrier, and each BWP includes one or more configured sidelink resources pools.

6. The method of claim 1, wherein the configuration for each of the multiple BWPs includes a resource pool configuration for each of the one or more sidelink resource pools associated with a corresponding BWP.

7. The method of claim 1, wherein a first resource pool of the first BWP and a second resource pool of the second BWP are for a centralized resource allocation mode and the first resource pool at least partially overlaps the second resource pool, the method further comprising:
   skipping decoding at least one sidelink message on an additional resource pool of a non-active BWP.

8. The method of claim 1, wherein a first resource pool and a second resource pool are for a distributed resource allocation mode and the first resource pool fully overlaps the second resource pool of the second BWP or does not overlap the second resource pool of the second BWP.

9. The method of claim 1, wherein the sidelink device selects transmission resources from a set of resources based on each transmission resource pool configured for the activated BWP.

10. The method of claim 1, wherein the indication of the BWP switch is transmitted or received in the SCI in a common resource pool that is common to the first BWP and the second BWP, wherein one or more of the PSCCH, a physical sidelink shared channel (PSSCH), or the PSFCH associated with the SCI are transmitted or received in the resource pool that is common to the first BWP and the second BWP, and the BWP switch is based on the first BWP and the second BWP having the common resource pool.

11. The method of claim 1, wherein the indication of the BWP switch is transmitted or received in the SCI in a first resource pool of the first BWP that is associated with BWP indications.

12. The method of claim 1, wherein if the first BWP and the second BWP on a sidelink carrier have a common resource pool, the first BWP and the second BWP have one or more of:
   a same subcarrier spacing (SCS),
   a same cyclic prefix (CP) configuration,
   time allocation based on a same starting symbol and symbol length, or
   common transmission occasions for the PSFCH, wherein the first BWP and the second BWP have the common transmission occasions for the PSFCH, wherein each resource pool of the first BWP and the second BWP are configured with a common PSFCH transmission period and slot offset.

13. The method of claim 1, wherein the activated BWP includes multiple resource pools, the method further comprising:
   performing discontinuous reception (DRX) or partial sensing for each of the multiple resource pools of the activated BWP, wherein the sidelink device applies a same DRX pattern or partial sensing pattern for each of the multiple resource pools of the activated BWP.

14. An apparatus for wireless communication at a sidelink device, comprising:
   memory; and
   at least one processor coupled to the memory and configured to:
      receive a configuration of multiple bandwidth parts (BWPs) for sidelink communication, each bandwidth part (BWP) comprising one or more sidelink resource pools;

activate a BWP from the multiple BWPs configured for the sidelink communication;

transmit or receive the sidelink communication in resources from a resource pool in the activated BWP;

transmit or receive sidelink control information (SCI) in a first BWP comprising an indication of a BWP switch from the first BWP to a second BWP, the SCI indicating a sidelink grant for a sidelink transmission in the first BWP; and switch to the second BWP in response to the indication of the BWP switch and after a physical sidelink feedback channel (PSFCH) associated with the sidelink transmission in the first BWP, wherein a switching time is defined for the BWP switch from a symbol comprising feedback for a physical sidelink control channel (PSCCH) that indicates the BWP switch to a first slot in which resource pools in the second BWP become active.

15. The apparatus of claim 14, wherein at least one sidelink resource pool is shared between two or more BWPs.

16. The apparatus of claim 14, further comprising:

at least one antenna; and a transceiver coupled to the at least one antenna and the at least one processor, wherein the at least one processor is further configured to:

monitor for the sidelink communication in the one or more sidelink resource pools of the activated BWP; and skip monitoring for the sidelink communication outside of the one or more sidelink resource pools of the activated BWP.

17. The apparatus of claim 14, wherein the at least one processor is further configured to:

perform a sidelink operation in the one or more sidelink resource pools of the activated BWP, the sidelink operation including at least one of:

selection of a resource for transmission of the sidelink communication from the one or more sidelink resource pools of the activated BWP, sense for resource reservations based on a distributed resource allocation mode, transmit a resource reservation based on the distributed resource allocation mode, transmit the feedback on the PSFCH, congestion control, or provide channel state information (CSI).

18. The apparatus of claim 14, wherein a plurality of sidelink resource pools is configured for a carrier, and each BWP includes one or more configured sidelink resources pools.

19. The apparatus of claim 14, wherein the configuration for each of the multiple BWPs includes a resource pool configuration for each of the one or more sidelink resource pools associated with a corresponding BWP.

20. The apparatus of claim 14, wherein a first resource pool of the first BWP and a second resource pool of the second BWP are for a centralized resource allocation mode and the first resource pool at least partially overlaps the second resource pool, and the at least one processor being further configured to:

skip decoding at least one sidelink message on an additional resource pool of a non-active BWP.

21. The apparatus of claim 14, wherein a first resource pool and a second resource pool are for a distributed resource allocation mode and the first resource pool fully overlaps the second resource pool of the second BWP or does not overlap the second resource pool of the second BWP.

22. The apparatus of claim 14, wherein the sidelink device selects transmission resources from a set of resources based on each transmission resource pool configured for the activated BWP.

23. The apparatus of claim 14, wherein the indication of the BWP switch is in the SCI in a common resource pool that is common to the first BWP and the second BWP, wherein one or more of the PSCCH, a physical sidelink shared channel (PSSCH), or the PSFCH associated with the SCI are transmitted or received in the resource pool that is common to the first BWP and the second BWP, and the BWP switch is based on the first BWP and the second BWP having the common resource pool.

24. The apparatus of claim 14, wherein the indication of the BWP switch is in the SCI in a first resource pool of the first BWP that is associated with BWP indications.

25. The apparatus of claim 14, wherein if the first BWP and the second BWP on a sidelink carrier have a common resource pool, the first BWP and the second BWP have one or more of:

a same subcarrier spacing (SCS), a same cyclic prefix (CP) configuration, time allocation based on a same starting symbol and symbol length, or common transmission occasions for the PSFCH, wherein the first BWP and the second BWP have the common transmission occasions for the PSFCH, wherein each resource pool of the first BWP and the second BWP are configured with a common PSFCH transmission period and slot offset.

26. The apparatus of claim 14, wherein the activated BWP includes multiple resource pools, and the at least one processor being further configured to:

perform discontinuous reception (DRX) or partial sensing for each of the multiple resource pools of the activated BWP, wherein the sidelink device applies a same DRX pattern or partial sensing pattern for each of the multiple resource pools of the activated BWP.

* * * * *